(12) United States Patent
Gross et al.

(10) Patent No.: US 12,106,093 B2
(45) Date of Patent: Oct. 1, 2024

(54) WORKFLOW TOOL AND METHOD TO BUILD, DEPLOY AND RELEASE APPLICATIONS TO ONE OR MORE CLOUD COMPUTING PLATFORMS

(71) Applicant: HashiCorp, San Francisco, CA (US)

(72) Inventors: Timothy Gross, San Francisco, CA (US); Mitchell Hashimoto, Manhattan Beach, CA (US)

(73) Assignee: HashiCorp, San Francisco, CA (US)

( * ) Notice: Subject to any disclaimer, the term of this patent is extended or adjusted under 35 U.S.C. 154(b) by 0 days.

(21) Appl. No.: 17/362,502

(22) Filed: Jun. 29, 2021

(65) Prior Publication Data

US 2022/0413844 A1     Dec. 29, 2022

(51) Int. Cl.
| | |
|---|---|
| *G06F 9/44* | (2018.01) |
| *G06F 8/71* | (2018.01) |
| *H04L 67/10* | (2022.01) |
| *G06F 8/30* | (2018.01) |
| *G06F 8/60* | (2018.01) |

(52) U.S. Cl.
CPC ............... *G06F 8/71* (2013.01); *H04L 67/10* (2013.01); *G06F 8/30* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 2012/0102486 A1* | 4/2012 | Yendluri | G06F 9/5072 717/176 |
| 2014/0282353 A1* | 9/2014 | Jubran | G06F 8/00 717/101 |
| 2015/0248280 A1* | 9/2015 | Pillay | G06F 8/41 717/106 |
| 2017/0123641 A1* | 5/2017 | Lance | G06F 8/30 |
| 2019/0087161 A1* | 3/2019 | Sathe | H04L 67/10 |
| 2019/0171438 A1* | 6/2019 | Franchitti | G06F 16/903 |
| 2020/0177591 A1* | 6/2020 | Pogrebinsky | G06F 8/61 |
| 2022/0114477 A1* | 4/2022 | Kou | G06N 20/00 |

* cited by examiner

*Primary Examiner* — Wei Y Zhen
*Assistant Examiner* — Lanny N Ung
(74) *Attorney, Agent, or Firm* — FisherBroyles LLP; James P. Cleary

(57) ABSTRACT

A workflow tool to build, deploy and release application code of an application to any of one or more cloud computing platforms. The workflow tool is executed by one or more processors to generate a single configuration file for the application, the single configuration file comprising, using a common command-line interface (CLI) language: a build configuration defining a build tool used for building the application; a deploy configuration defining a cloud computing platform to which the application will be deployed; and a release configuration defining logic for releasing the application to one or more users of the cloud computing platform. The workflow tool further includes a release uniform resource locator (URL) generated by the first processor, the release URL providing access, by the cloud computing platform to the one or more users, to the application upon the releasing.

7 Claims, 9 Drawing Sheets

```
300
project = "project-name"

app "app-name" {
  path = "./src"
  build {          ← 302
    # ...
  }
  deploy {         ← 304
    # ...
  }
  release {        ← 306
    # ...
  }
} plugin "plugin-name" {
}
```

FIG. 5

```
project = "my-project"

app "wp-react" {
  path = "./src"
  build {
    use "pack"
  }
  registry {
    use "docker" {
      image = "waypoint/demojs"
    }
  }
  deploy {
    use "kubernetes" {
      probe_path = "/"
    }
  }
  release {
    use "kubernetes" {
      load_balancer = true
      port = 80
    }
  }
}
```

FIG. 6

```
project = "example-java"

app "example-java" {
  build {
    use "pack" {
      builder="paketobuildpacks/builder:base"
    }
  }
  deploy {
    use "docker" {
      service_port=8080
    }
  }
}
```

FIG. 7

```
» Building...
 √ Creating pack client
 √ Building image
 √ Injecting entrypoint binary to image Generated new Docker image: example-nodejs:latest » Deploying...
 √ Setting up waypoint network
 √ Starting container
 •: App deployed as container: example-nodejs-01EMM4TEN9SCXXE9O0F4EFQ9NR » Releasing...

The deploy was successful! A Waypoint deployment URL is shown below. This
can be used internally to check your deployment and is not meant for external
traffic. You can manage this hostname using "waypoint hostname."

Release URL: http://192.168.1.79

Deployment URL: https://instantly-worthy-shrew--v1.waypoint.run
```

FIG. 8

WORKFLOW TOOL AND METHOD TO BUILD, DEPLOY AND RELEASE APPLICATIONS TO ONE OR MORE CLOUD COMPUTING PLATFORMS

TECHNICAL FIELD

The subject matter described herein relates cloud computing infrastructure, and more particularly to a workflow tool that uses a single configuration file to build, deploy and release applications across one or more cloud computing platforms.

BACKGROUND

Virtually all software applications, i.e. computer programs that are designed and written to fulfill a particular purpose or perform a particular function, have a similar lifecycle. As shown in FIG. 1, this lifecycle includes largely sequential phases of coding, testing, building, deploying, releasing, and then operating and measuring the application code. Each of these phases have distinct patterns, and can be performed using one or more well-established but phase-specific tools.

For instance, the coding and testing phases for application development typically occur within a development environment that is separate from the eventual operational infrastructure on or within which the application will be operated. The coding phase can include the use of conventional and well-known code editing tools such as Visual Studio®, while for the testing phase a development team can use a CI environment such as Circle™ and/or post the code to a code management and version control hosting platform such as Github™.

Similarly, at the opposite end of the software lifecycle in the operate and measure phases, and in particular with respect to cloud-based applications running on cloud or multi-cloud infrastructure, tools such as Terraform®, Kubernetes®, Nomad®, Datadog®, etc. are commonly used for operating and measuring application code, no matter which specific cloud infrastructure is used.

However, in the build, deploy, and release phases of the application development lifecycle, things are much more complicated. For instance, the build phase exhibits a lack of standardization between application development tools, especially for cloud-based implementations. The deploy phase typically utilizes a fragmented mix of scripts, integration tools, and product "handoffs," i.e. the collaborative work between development and operation teams. And, the release phase currently requires domain-specific skills that do not translate well across or between cloud platforms, as each platform has its own unique and often proprietary operating parameters, communication protocols, maintenance and version control procedures, etc. Accordingly, these three "middle" phases of the software development and deployment lifecycle are very complex and the workflow through them is difficult to manage, particularly in a multi-cloud operating environment.

There is thus a need for a better interface to manage the build, deploy and release phases. Currently, developers might utilize makefiles, i.e., a file that defines a set of tasks to be executed. However, makefiles (or "maketasks") are very difficult to scale, and there is limited common or shared knowledge around this practice. Another option is to use continuous integration/continuous deployment (CI/CD) pipelines to hide the software behind an interface, such as a "git push" or by clicking a button in the CI user interface (UI). But, like makefiles, this solution tends to be very organization-specific and very fragmented between different CI environments and their respective integration and deployment tools. Yet another option currently being used is a Platform as a Service (PaaS), which provides a clean path to get an application to production. But, any action or communication that extends beyond the platform will tend to break down or become overly complicated.

Accordingly, there remain many challenges to getting an application from code into a deployment platform, despite a large and growing array of choices for such deployment. What is needed is a workflow tool to build, deploy and release applications for deployment to one or more cloud computing platforms.

SUMMARY

This document describes a workflow tool to build, deploy and release application code of an application to any of one or more cloud computing platforms. The workflow tool includes, or is implemented by, one or more processors configured to generate a single configuration file for the application. The single configuration file includes, in some implementations with a common command-line interface (CLI) language, a build configuration defining a build tool used for building the application, a deploy configuration defining a cloud computing platform to which the application will be deployed, and a release configuration providing logic for releasing the application to one or more users of the cloud computing platform. The workflow tool further includes or generates a release uniform resource locator (URL) generated by the first one or more processors, the release URL providing access, by the cloud computing platform to the one or more users, to the application upon the releasing.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a workflow tool to build, deploy and release applications to one or more cloud computing platforms, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 shows a single configuration file that defines a consistent workflow for the build, deploy and release phases for an application deployment to a cloud platform;

FIG. 6 shows the single configuration file employing a Docker® build and a Kubernetes® deployment and release;

FIG. 7 shows a build and deploy configuration using a Buildpacks implementation;

FIG. 8 illustrates an output example when the workflow tool is run, showing the build, the output as part of that, the deploy happening, and then a release at the end including a release URL and a deployment URL;

When practical, similar reference numbers denote similar structures, features, or elements.

DETAILED DESCRIPTION

This document describes a workflow tool to build, deploy and release application code of an application to any of one or more computing platforms, especially cloud computing platforms in light of the wide variety of cloud computing platforms that now run applications. The term "platform" refers to herein as any computing platform on which an application can run. The workflow tool described herein provides a consistent workflow to build, deploy, and release applications on any platform. In some implementations, the workflow tool is provided in a single command that encapsulates the build, deploy, and release phases to get an application from development into production.

In preferred exemplary implementations, within an application development environment, each project can have an associated configuration file. The configuration file defines each of the build, deploy and release phases, and further respectively defines and specifies the specific tool used for the build, the operation platform for which the application is intended, and the logic desired to release to the public via the operation platform. These aspects and features are described in more detail below.

Figure 1:
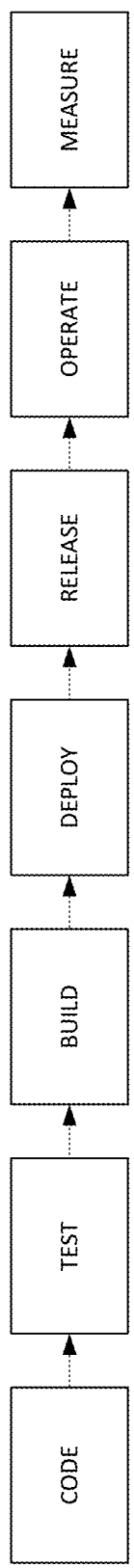
FIG. 1 illustrates a software application lifecycle from development to deployment.
Figure 2:
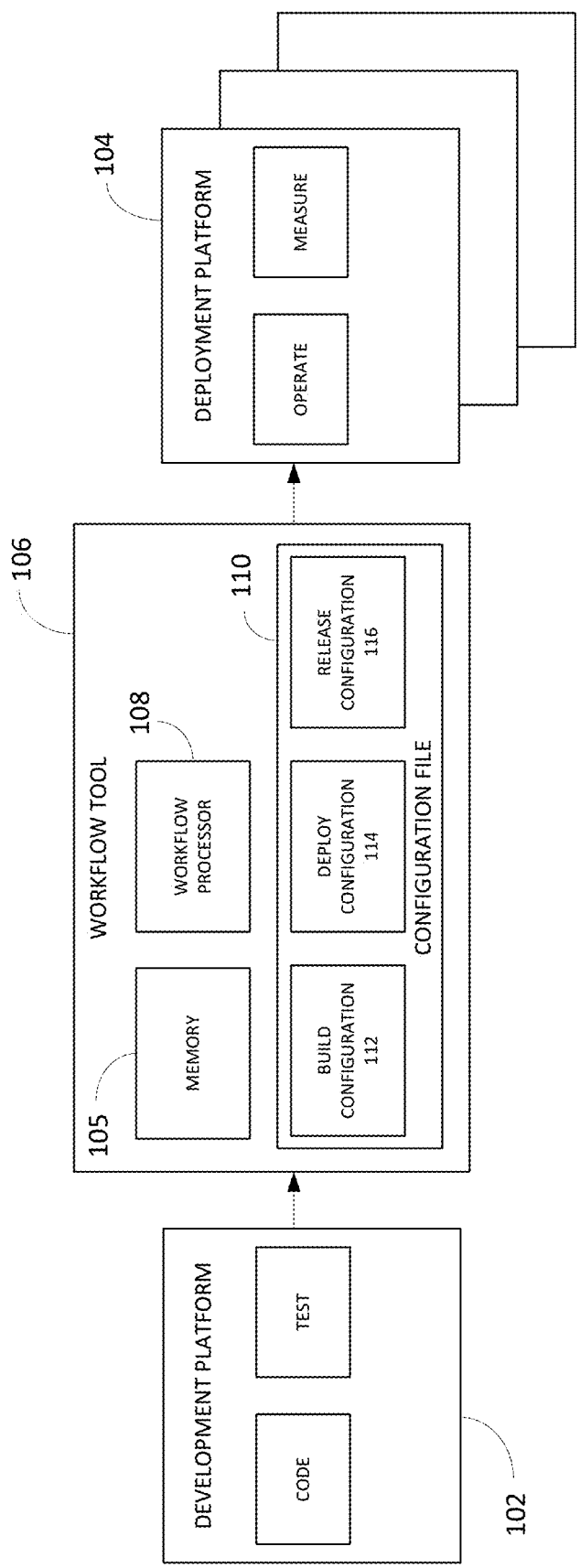
FIG. 2 is a diagram illustrating aspects of a system including a workflow tool, showing features consistent with implementations of the current subject matter.

In implementations consistent with the details described herein, and as illustrated in FIG. 2, a workflow tool 106 is provided to manage and execute the build, deploy and release phases of application deployment, between a development platform 102 (in which coding and testing take place) and a deployment platform 104 (to which an application is deployed to be operated and measured). The workflow tool 106 is executed by a first processor (i.e. workflow processor 108, which can be one processor or multiple processors, and a memory 105 that includes the code for the workflow tool 106) that is configured to generate a single configuration file 110 for the application. The single configuration file 110 can be generated using a common command-line interface (CLI) language, such as HashiCorp Configuration Language (HCL), and which can be stored in the memory 105. HCL is a configuration language built by HashiCorp® that uses human-readable text but is structured to be machine friendly for use with command-line tools, is JavaScript Object Notation (JSON) compatible, and can also accommodate comments.

The single configuration file 110 includes a build configuration 112 that defines a build tool used for building the application, a deploy configuration 114 defining the cloud computing platform 104 to which the application will be deployed, and a release configuration 116 defining logic for releasing the application to the intended cloud computing platform 104 for use by one or more users. The workflow tool 106, when executed on one or more workflow processors 108, is further configured to generate a release uniform resource locator (URL) to provide access by the one or more users to the application executing on the deployment platform 104 upon its release.

Configuration File

Each of the build, deploy and release configurations for a project and associated application are integrated into a single configuration file 300, as illustrated in FIG. 5. In this example, a build configuration 302, a deploy configuration 304, and a release configuration 306 define the build phase, the deploy phase, and the release phase, respectively, of the application lifecycle for the application and project. By having these three configurations 302, 304, 306 in one configuration file 300, a single file can be referenced by a user to know the full logic and lifecycle of how that application gets to production. Thus, while the workflow tool 106 does not replace tools such as container-orchestration systems for application deployment to a cloud platform, like Kubernetes®, Helm®, or Docker®, it is configured to wrap these and other tools in the single configuration file 300, provide them together in a proper order for successful application deployment, and provide a consistent workflow on top of them.

The build configuration 302 takes application source code and uses a build process or tool to convert the application code to an artifact. An artifact is a packaged form of an application required on a target platform: a container image, virtual machine image, even a simple ZIP file, or the like, for example. The build process may also include an optional "push" operation to push the built artifact to a registry so that is available for the deployment platform. For instance, the workflow tool can include a set of built-in plug-ins for tools to build a container or image for an application, such as Docker Build (see FIG. 6), Docker Pull Build, and Cloud Native Buildpacks, etc., or the like (see FIG. 7).

In one exemplary implementation, as shown in FIG. 6, configuration file for a project "my-project" uses Cloud Native Buildpacks for the build component, and Docker as a registry from the build process. Kubernetes native systems are used for the deployment component as well as the release component. Accordingly, the Kubernetes service primitives are used to point to the correct deployment for the public to see, but in a consistent workflow defined by the single configuration file.

FIG. 8 shows an exemplary output when the workflow tool is run, showing the build, the output as part of that, the deploy happening, and then a release at the end. As shown in FIG. 8, with the release, a release URL is provided. The release URL is the public URL provided by the release platform by which users can access this application. This is provided by the platform.

Further, a deployment URL is generated. The deployment URL has a specific domain, in this example a waypoint.run domain named after a name of the workflow tool. This domain uses a service that is run, separate from the workflow tool, to provide routable URLs for all deployments. This can be an optional service, but which can provide a URL to every application built, irrespective of the platform it is on, and it is consistent. Accordingly, the workflow tool described herein works with any application code and with any platform. It does not matter what programming language is used, or which platform the application is being deployed to, the workflow tool provides a consistent workflow, URL output, and deployment URLs.

Validating Deployments

Figure 3:
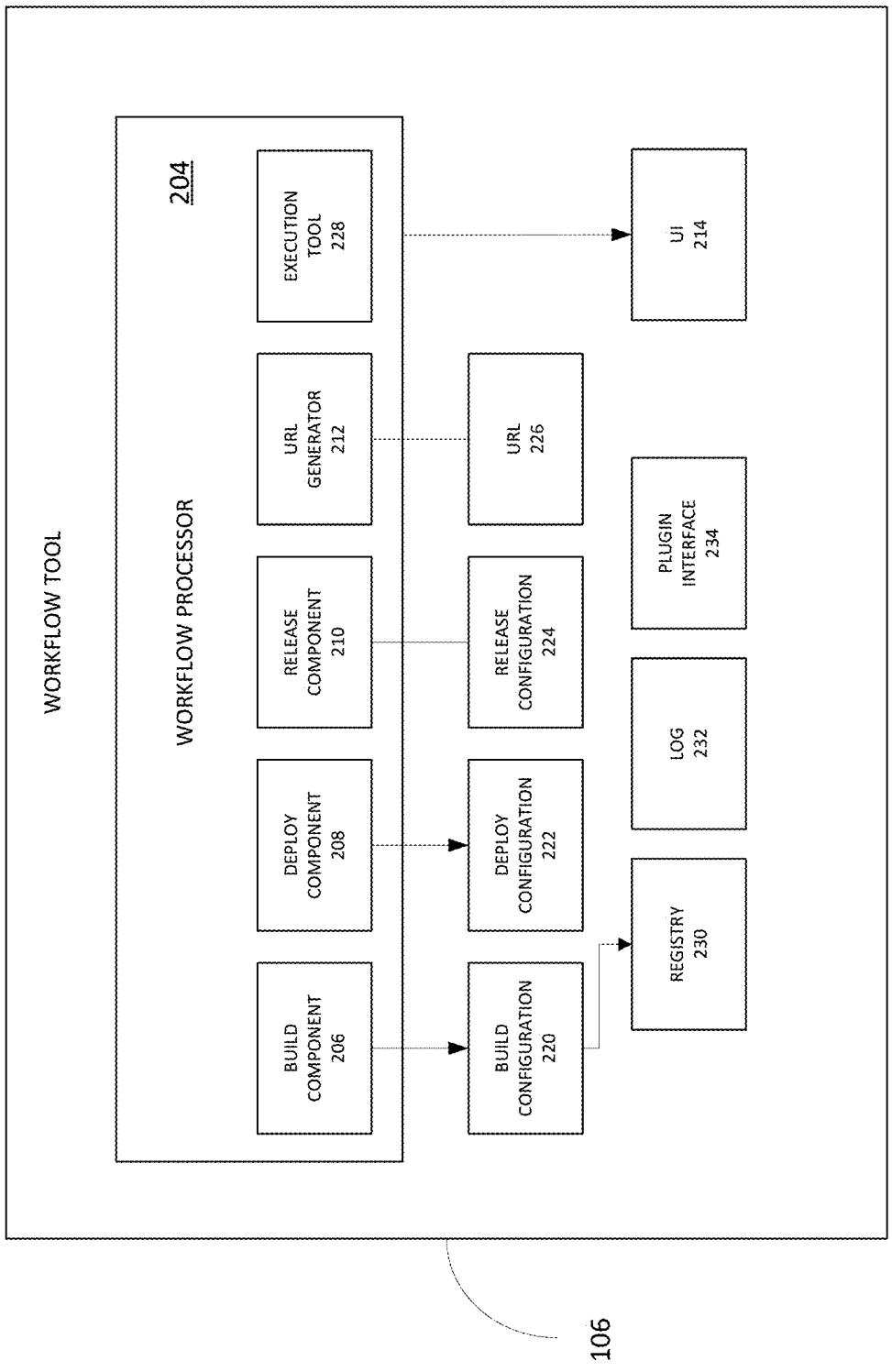
FIG. 3 is a block diagram illustrating aspects of a workflow tool according to various implementations of the current subject matter.

Once the workflow tool is run, i.e. the built application is deployed, the next aspect is to be able to tell whether the application is running, regardless of which deployment tool is used. In some cases, this step may entail opening up a URL in a UI, refreshing the URL a few times, or checking logs related to the deployment. While these steps can often work, for efficiency and greater validation, as shown in FIG. 3, a workflow tool 106 can include several integrated tools and features that allow a user to easily validate that an application deployment is working correctly. For instance, a build process of a build component 206 of the workflow processor 204 may also include an optional "push" operation to push the built artifact to a registry 230 so that is available for the deployment platform.

UI

Figure 4:
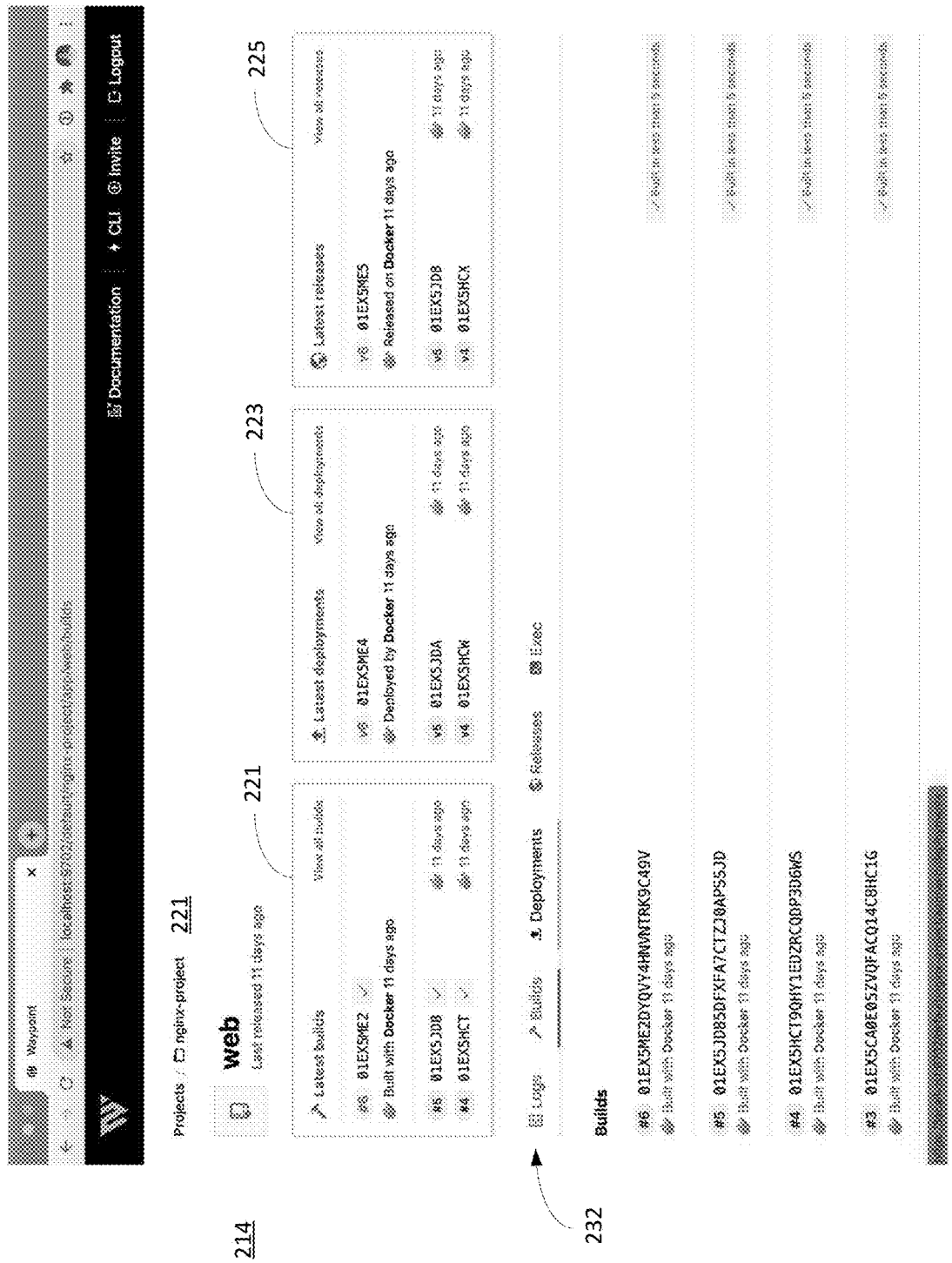
FIG. 4 shows a user interface in an exemplary graphical form.

In some implementations, the workflow tool 202 can generate a UI 214. The UI 214 can include one or more graphical user interfaces rendered in a display connected with a workflow processor 204. The UI 214 is configured to display a list of actual builds 221, deploys 223, and releases 225, URLs 226 (such as release URL and deployment URL), as well as a current status of each of these. FIG. 4 shows the UI 214 in an exemplary graphical form, and illustrates a graphical user interface for one of any number of projects 221. The UI 214 can be customizable and/or configurable to suit user preferences. For instance, the UI 214 can have a "dark mode" for nighttime or viewing the UI 214 in a darkened environment. As discussed above, the UI 214 displays a list of builds 220, deploys 222, and releases 224, and a current status of each of these, as well as a set of logs 232 for each of these steps in the workflow for the project 221. Accordingly, the UI 214 provides an intuitive, interactive and efficient mechanism by which to verify that a deployment is complete.

Execution Tool

In some implementations, the workflow tool further includes an execution tool 228 that can be used to open a shell or execute any process in the context of a deployment. In some implementations, the execution tool 228 is a tool that is provided on the command line, along with the build, deploy and release configurations 221, 223 and 225, respectively. The execution tool 228 provides access to any deployment, to allow a user to be able to ensure the application is properly deployed and running as intended. The execution tool 228 enables a user to execute commands in the context of a deployed application, and can be used to open up a shell for debugging, execute database migrations, and other application-specific functions. In some implementations, the execution tool 228 works by picking a random running instance of the latest deployment of the application, and executing within that environment.

The execution tool 228 works across any platform to which an application is to be deployed, despite similar functionality provided by each separate deployment tool, such as Kubernetes® or Google Cloud Run, or EC2 instances, etc. The execution tool 228 provides a similar experience across any deployment tool used, and therefore provides a consistent access to deployed application no matter which deployment is used, all without needed to exit the workflow tool and enter into a specific deployment tool's execution functionality.

Logs

In some implementations, another validation tool provided by the workflow tool 106 is a set of logs 232, displayable by the workflow tool 106, from which a user can see all the recent logs from each deployment of each application, which are also depicted in FIG. 4. The logs 232 shown in FIG. 4 display activity for the builds 220, but can also display deploys 222 and releases 224, as well as any other executions from the execution tool 228.

As with the execution tool, the workflow tool logs 232 work across every platform, as well as with each deployment tool, and using a consistent workflow. In some cases, these logs 232 are not meant to replace long-term log storage or log searching, especially since most deployment tools include their own log functionality, but rather are configured to provide log access for a recent history of deployments, so as to enable a user to quickly see each deployment and/or to verify that each specific deployment is up and running as expected. These logs 232 further assist a user in being able to debug any issues that get logged during the deployment.

Extensibility

A key feature of the workflow tool, particularly for operating in a multi-cloud platform environment, is extensibility. Accordingly, in some implementations the workflow tool 202 includes a plugin interface 234, which enables the workflow to be flexible and work in any of a variety of present or future scenarios. For example, a common way to display applications is using practices such as Continuous Integration/Continuous Deployment (CI/CD), which is a standard practice in software engineering, especially when involving large development teams. In these scenarios, CI/CD is one preferred way to integrate the build-deploy-release cycle of the workflow. Accordingly, the workflow tool 106 can configured to be run directly within existing CI/CD platforms, such that deploying an application can be consistent across a variety of different places in a CI/CD environment.

Another example is a similar set of practices known as GitOps, or a Git-based workflow, which describes systems with declarative specifications that form the basis of continuous operations and tasks. Typically, a Git-based workflow includes a Git "push," which triggers a deployment either to production or to a preview state. To accommodate these practices, the workflow tool 106 can include one or more plugins to the plugin interface 234 for different control systems so that versioning and other operations can be directly integrated with Git workflows. With such GitHub integration, every branch will get a separate build-deploy-release component, and a deployment URL that is branch-specific, to allow a user to view any branch, get a preview of its deployment and how it is working, and then when it is merged into the main brand, the workflow tool will deploy it into production.

The workflow tool 106, via the plugin interface 234, is therefore extensible to these and other tools and practices for deploying applications, and which not only allows users to work in those deployment environments, but across multiple deployment environments in a highly consistent manner. The CLI of the workflow tool enables this consistency.

Figure 9:
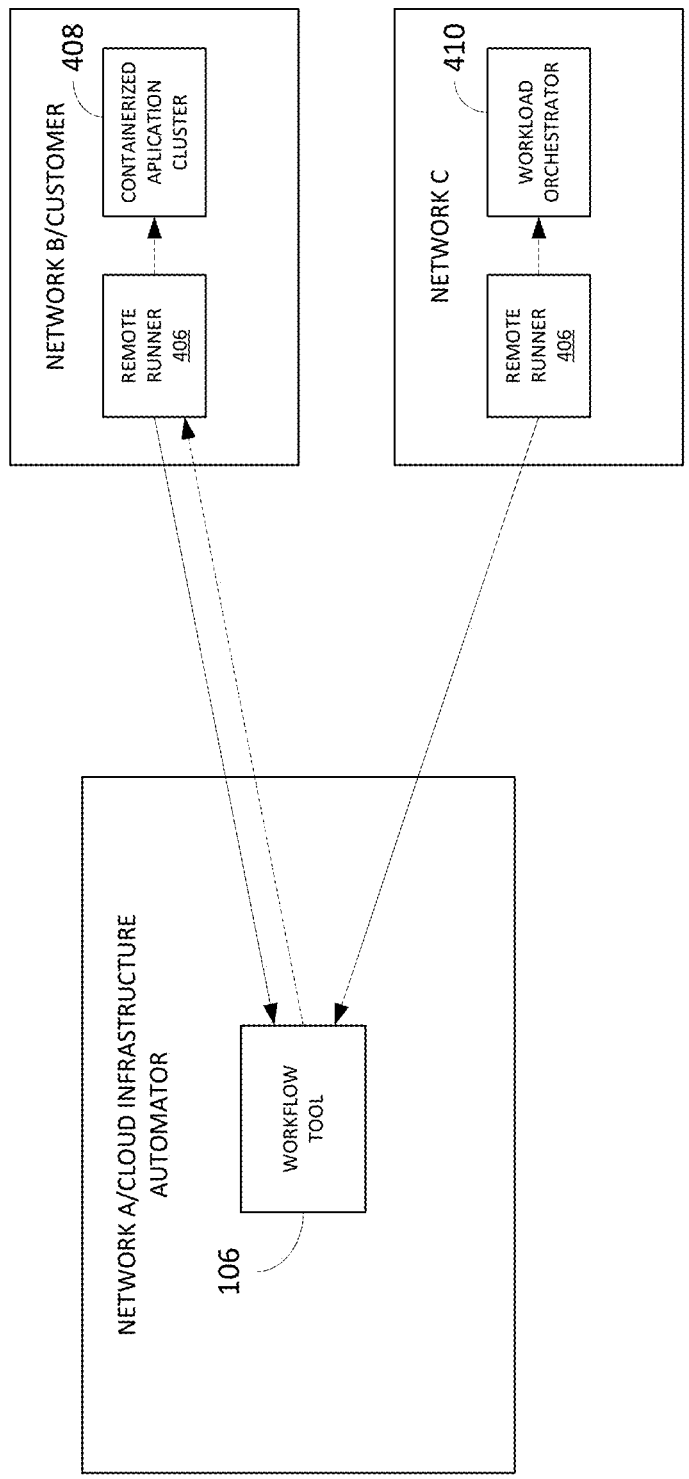
FIG. 9 illustrates remote runners for use with the workflow tool.

FIG. 9 depicts another form of extensibility via remote runners 406, which are remote workflow tools that execute workflow tool operations remotely. The remote runners 406 are configured to perform builds and deploys, polling projects for changes, and more. Consider the exemplary implementation shown in FIG. 9, in which a network A can include a central workflow tool 106, as is described herein. Network A can be a cloud infrastructure automation network, such as Hashicorp® Cloud Platform (HCP) or other cloud infrastructure provisioning system using the workflow tool 106 for building, deploying and releasing applications in a cloud computing environment.

In preferred implementations, the workflow tool 106 includes a workflow server, which can be hardware, software, or both, and the remote runners 406 can run anywhere via connectivity to the workflow server. For example, as shown, network B can be an application environment provided by a customer, and employing a containerized application cluster 408 such as Kubernetes®, and network C can be a separate application environment employing a workload orchestrator 410 such as Nomad® by Hashicorp®. Other types of remote networks are possible.

A request for an action or local resources, i.e. from network B, can be sent from a remote runner 406 to the workflow server of the workflow tool 106, which will in turn interface with the local resources at the containerized application cluster 408 via remote runner 406 in network B. Accordingly, remote runners 406 enable necessary security functionality, since user of the command line interface (CLI) of the workflow server of the workflow tool 106 no longer need direct access to the targets they are deploying to (i.e. network B and/or network C), nor need credentials to access those targets. The CLI needs only access to the workflow server of the central workflow tool 106, and the remote runners 406 can maintain the credentials needed to deploy in their corresponding network environments. Therefore, customers can build, deploy and release resources within their own private, controlled environment via remote runners 406.

Figure 10:
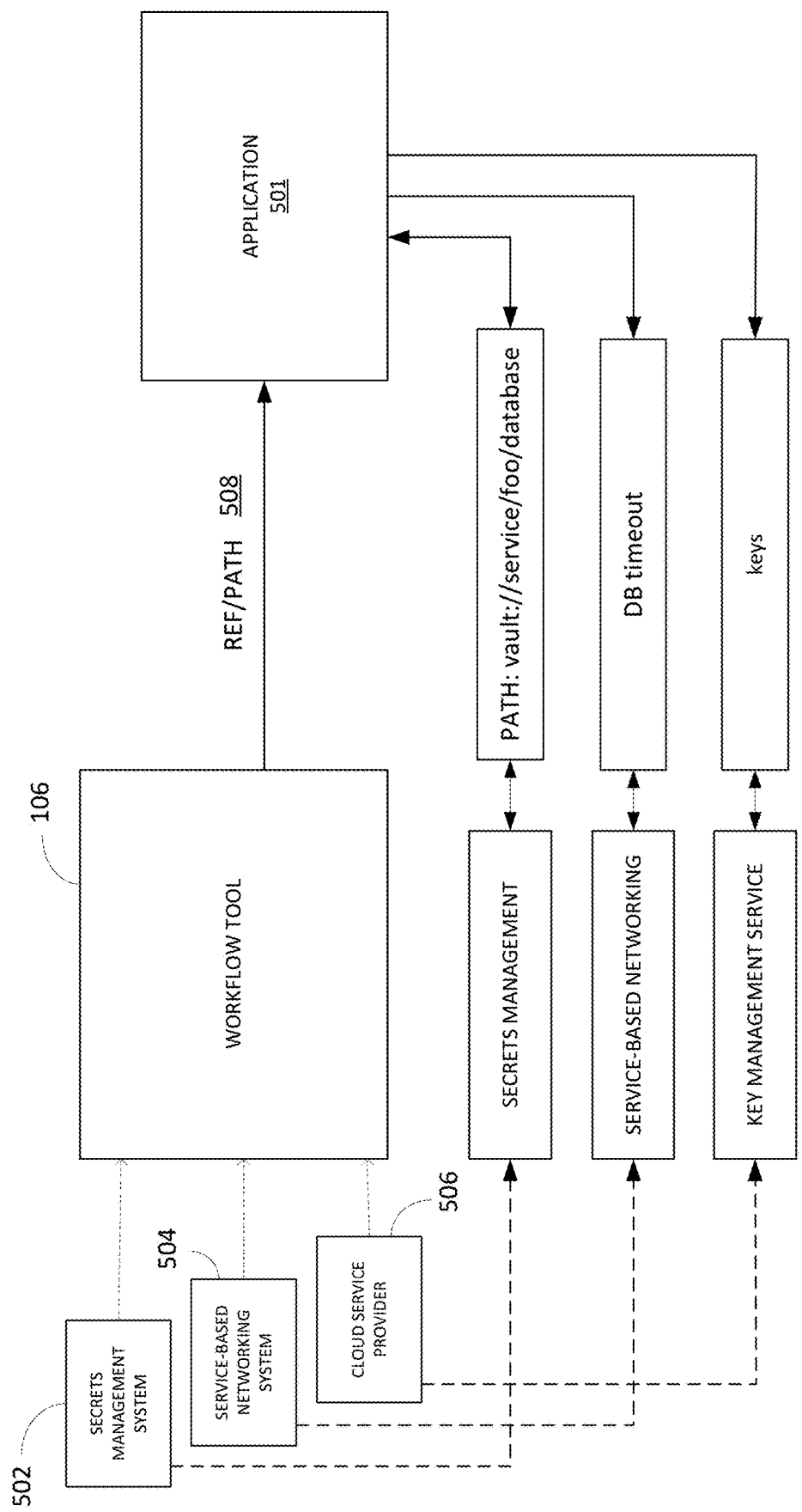
FIG. 10 illustrates secrets management for a workflow tool to build, deploy and release applications to one or more cloud computing platforms.

FIG. 10 illustrates secrets management for a workflow tool 106 to build, deploy and release applications 501 to one or more cloud computing platforms, in accordance with some implementations of the present disclosure. Secrets can include credentials such as usernames and passwords, such as provided by a secrets management system 502 such as Vault® by Hashicorp, database parameters and timeouts as provided by a service-based networking system 504 such as Consul® by Hashicorp, and configuration or database keys as provided by a key management service of a cloud service provider 506, such as AWS®. In some implementations, only a reference to necessary credentials, database timeouts, and keys are provided to the application 501 by a reference path 508

At the application, the references are received, and can be directed to the external system, such as secrets management system 502, service-based networking system 504, and cloud service provider 506, such that the workflow tool 106 does not need to specify a value of the secret, but rather can rely on the reference to obtain the value directly from the associated system.

Figure 11:
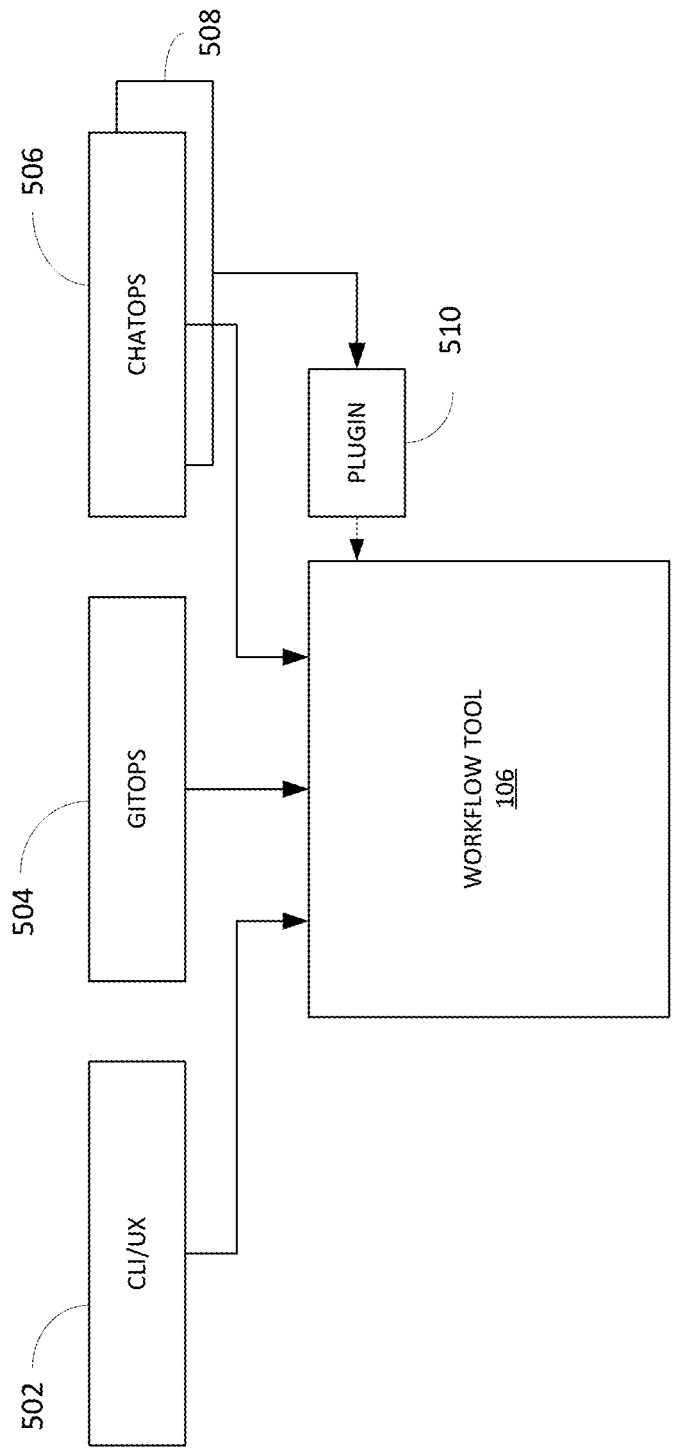
FIG. 11 illustrates chat-ops integration for the workflow tool.

FIG. 11 illustrates chat-ops integration for the workflow tool 106. As shown, application code to the workflow tool 106 can be provided by a command line interface/user interface or experience (CLI/UX) 502, such as the CLI for Hashicorp HCP®. Other code and commands to the workflow tool 106 can be received from a GitOps system and repository 504, which can provide application code from a GitHub or other similar open-source repository. Further, various online code development platforms with a chat function, or chat-ops such as Slack®, have been introduced recently where developers and programmers can share code and associated commentary via a chat interface. The workflow tool 106 is configured for two-way interaction with many such chat-ops 506, but other chat-ops 508 can communicate with the workflow tool 106 via a plug-in 510. Thus, the workflow tool 106 can receive code and other instructions from a multitude of sources, directly or via plug-in 510.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for building, deploying and releasing application code of an application to any of one or more cloud computing platforms, the system comprising:
   a programmable processor; and
   a non-transitory machine-readable medium storing instructions that, when executed by the processor, cause the at least one programmable processor to perform operations comprising:
      generating a single configuration file for the application, the single configuration file comprising, using a common command-line interface (CLI) language:
         a build configuration defining a build tool used for building the application;
         a deploy configuration defining a cloud computing platform to which the application will be deployed;
         a release configuration defining logic for releasing the application to one or more users of the cloud computing platform; and
         an execution tool that works across any platform to which the application is deployed, the execution tool being configured for opening a shell of the application for debugging and executing database migration of the application based on any of the build configuration, the deploy configuration and the release configuration, and for enabling any of one or more second processors to execute any process of the application or the shell of the application; and
      generating a release uniform resource locator (URL), the release URL providing access, by the cloud computing platform to the one or more users, to the application upon the releasing.

2. The system in accordance with claim 1, wherein the operations further comprise generating a deployment URL having a run domain in which to execute the application by one or more second processors associated with the one or more users.

3. The system in accordance with claim 1, further comprising a user interface (UI) that provides a list of all applications built, deployed, and released by the workflow tool according to the configuration file for each application.

4. The system in accordance with claim 1, further comprising a set of logs associated with an execution, by one or more second processors, of the application.

5. The system in accordance with claim 1, wherein the operations further comprise generating a plug-in interface for integrating the configuration file with deployment-specific tools associated with one or more deployment platforms.

6. The system in accordance with claim 5, wherein the deployment-specific tools include a second execution tool for executing at least part of a deployed application.

7. The system in accordance with claim 5, wherein the deployment-specific tools include a code and chat operations application.

* * * * *